May 11, 1965 E. COUSINS 3,182,706
ANTI-SKID TIRE
Filed March 4, 1963

INVENTOR.
EDWARD COUSINS
BY
J.B. Holden
ATTORNEY

United States Patent Office
3,182,706
Patented May 11, 1965

3,182,706
ANTI-SKID TIRE
Edward Cousins, Akron, Ohio, assignor to The Goodyear Tire & Rubber Company, Akron, Ohio, a corporation of Ohio
Filed Mar. 4, 1963, Ser. No. 262,469
4 Claims. (Cl. 152—211)

This invention relates to metal anti-skid or traction augmenting members or inserts adapted to be embedded in the rubber tread of vehicle tires.

It is an object of this invention to provide an improved anti-skid tire construction having metal traction augmenting inserts therein which provide a large number of traction augmenting points at the tread surface for substantially the entire useful life thereof in which the metal inserts may be economically embedded in the tire tread during manufacture of the tire.

Another object of the invention is to provide a nonskid tire construction having traction augmenting inserts made of metal wire which have a plurality of substantially parallel teeth terminating at the tread surface of the tire which teeth are interconnected or interlocked solely at the base thereof.

Other objects and advantages of the invention will become apparent in reference to the accompanying drawings, in which FIG. 1 is an isometric view of a tire with parts broken away and in cross section showing the preferred traction augmenting insert of the present invention embedded in the tread thereof;

Figure 1:
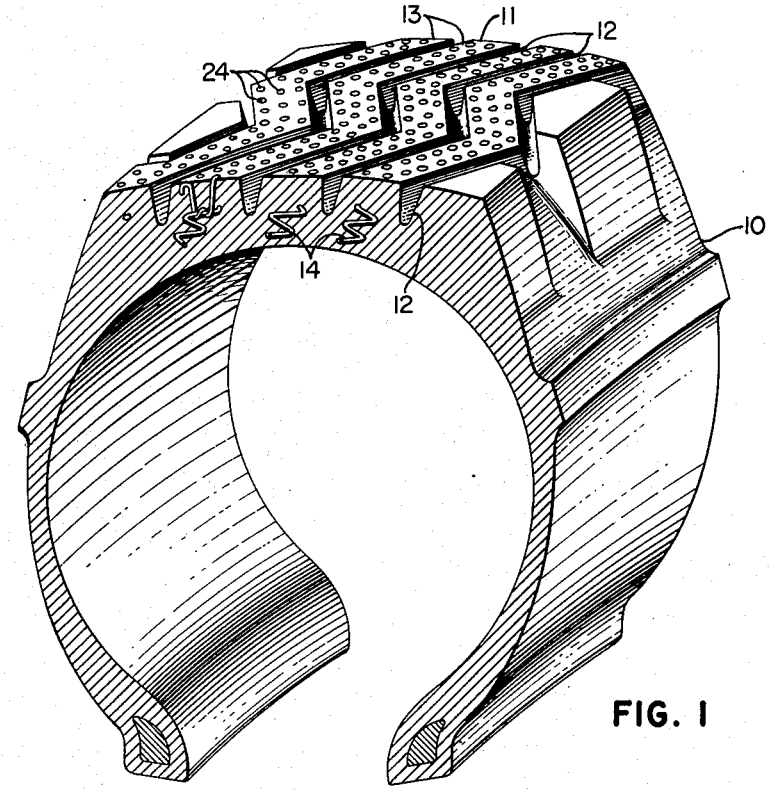

Referring to the drawings, numeral 10 designates a tire having a tread 11 which for the purpose of illustrating the invention is provided with a plurality of circumferentially extending grooves 12 forming intervening ribs 13. It is to be understood that the invention is applicable to a tire having any tread design including, but not limited to, circumferentially or transversely extending lugs and/or ribs.

The traction augmenting insert 14 is embedded in each of the ribs 13 so that the insert will be fully effective to increase traction of the tire on icy or wet pavement during the complete tread life of the tire. Preferably, the insert 14 has a width substantially the same as the depth of the grooves 12 and ribs 13 and extends both transversely and longitudinally relative to the ribs 13.

Figure 2:
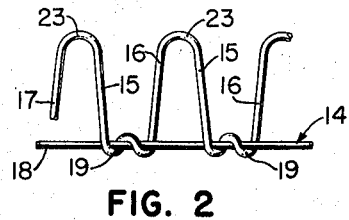
FIG. 2 is a fragmentary view of the traction insert shown in FIG. 1.

Referring to FIG. 2, the insert 14 is made of metal wire, preferably steel, and consists of a plurality of pairs of substantially parallel teeth 15 and 16 formed of a continuous wire 17 which is wrapped around the longitudinally continuous base wire 18 intermediate the teeth 15 and 16. Preferably, the central portion 19 of the wire 17 forming the teeth 15 and 16 is turned at least 360° or looped at least once around the base wire 18 and is tightly cinched to the base wire 18 so that the central portion 19 is interconnected or interlocked to the base wire 18 and holds the teeth in aligned substantially parallel relationship.

Figure 4:
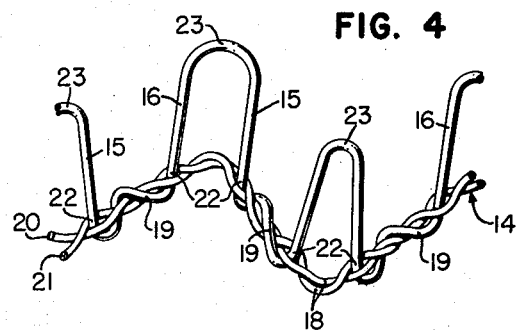
FIG. 4 is a fragmentary plan view of a modification of traction insert of the present invention.
Figure 3:
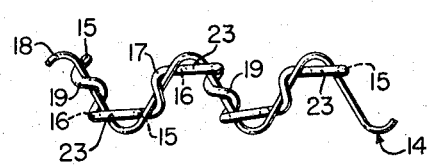
FIG. 3 is a plan view of the traction insert shown in FIG. 2.

As shown in FIG. 4 of the drawings, the central portion 19 of each of the wires 17 forming the pairs of teeth 15 and 16 may be interconnected or interlocked with a continuous base member 18 comprising a plurality of strands of wire 20 and 21. The central portion 19 is looped or turned around each of the wires 20 and 21 at least once and the base wires 20 and 21 are, in turn, twisted around each other and around the base 22 of the teeth 15 and 16.

In the modification shown in FIG. 4, it is preferred that the base wires 20 and 21 are of substantially lesser gauge or diameter than the wire forming the teeth 15 and 16 so as to provide less bulk and greater flexibility at the base of the insert.

Preferably, the inserts 14 are coated with a suitable bonding agent, such as plasticized phenyl formaldehydes, isocyanate resins, or other well-known adhesives for bonding metal to rubber so that the inserts will be retained within and secured to the rubber tread during the life thereof.

The inserts 14 shown in FIGS. 2 and 4 are preferably bent at longitudinally spaced locations so that the base wire or wires 18 extends in a sinuous path as illustrated. The insert 14 is preferably embedded in the tread with the base 18 located at approximately the same depth in the tread as the base of the grooves 12. During operation of the tire, the terminal ends 23 joining the teeth 15 and 16 are rapidly worn off resulting in the exposure of an ending 24 of the teeth 15 and 16. Obviously, the terminal ends 23 may be mechanically removed either prior to or subsequent to the embedding of the insert in the ribs 13 or other traction elements of the tread.

While certain representative embodiments and details have been shown for the purpose of illustrating the invention, it will be apparent to those skilled in this art that various changes and modifications may be made therein without departing from the spirit or scope of the invention.

What is claimed is:

1. In a tire, a rubber tread portion integral therewith, having at least one anti-skid insert made of metal wire embedded in the tread portion, said insert having a width of substantially the same dimension as the thickness of the tread, said insert having at least one continuous base member extending longitudinally of the insert and a plurality of pairs of substantially parallel teeth spaced from each other and projecting from said base member and terminating at the tread surface, each pair of teeth formed of a length of wire, the central portion of said length of wire being looped around and interlocked with said base member, whereby said teeth are maintained in interlocked relationship throughout the life thereof to prevent them from being thrown out of said tread.

2. A tire as claimed in claim 1 in which said base member consists of a plurality of longitudinally continuous wires which are twisted together.

3. A tire as claimed in claim 2 in which the wires which form said base member are twisted about the central portion of the length of wire forming said teeth.

4. In a tire, a rubber tread portion integral therewith, having at least one anti-skid insert made of metal wire embedded in the tread portion, said insert extending longitudinally and transversely of said tread portion said insert having a width of substantially the same dimension as the thickness of the tread, said insert having at least one base wire extending continuously longitudinally of the insert, said insert having a plurality of pairs of metal wire teeth which are substantially parallel to and spaced from each other, said teeth being secured to said base wire and forming a plurality of traction augmenting endings at the tread surface of the tire, each pair of said endings comprising the ends of a single length of wire, the central portion of said length of wire being looped around and interlocked with said base wire, whereby said teeth are maintained for the complete life of the tread in interlocked relationship to prevent them from being thrown out of said tread.

References Cited by the Examiner

UNITED STATES PATENTS

| | | | |
|---|---|---|---|
| 1,740,616 | 12/29 | Midgley | 152—211 |
| 2,557,945 | 6/51 | Crooker | 152—211 |
| 3,003,534 | 10/61 | Cousins | 152—211 |

ARTHUR L. LA POINT, *Primary Examiner.*